April 13, 1965     E. B. DEUSCHLE ETAL     3,177,977
BRAKE FOR RADIAL ARM SAWS OR LIKE MACHINING TOOLS
Filed June 26, 1962     3 Sheets-Sheet 1
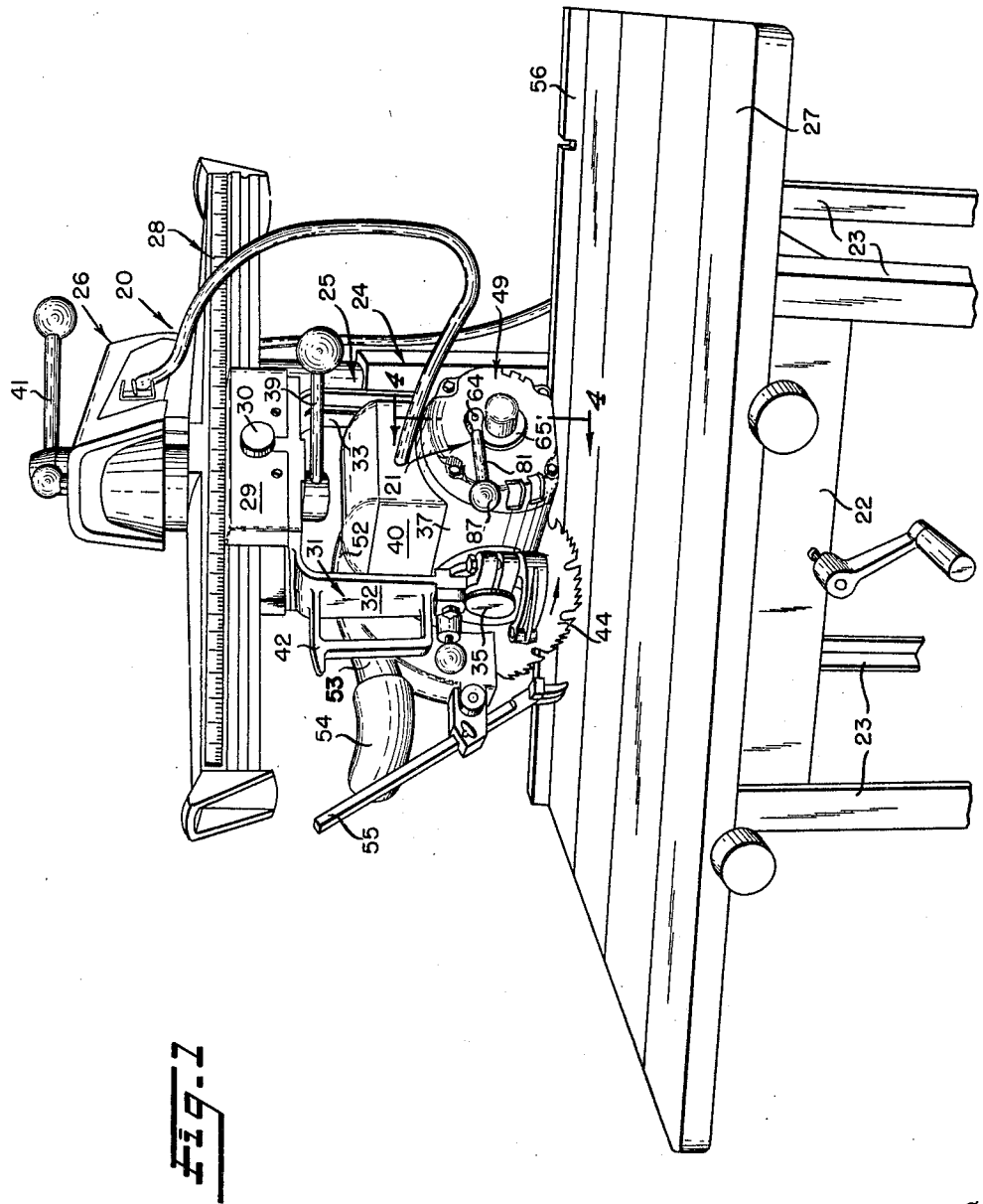
INVENTORS
Edwin B. Deuschle
Rex P. Deghuee
BY
ATTORNEYS April 13, 1965     E. B. DEUSCHLE ETAL     3,177,977
BRAKE FOR RADIAL ARM SAWS OR LIKE MACHINING TOOLS
Filed June 26, 1962     3 Sheets-Sheet 2
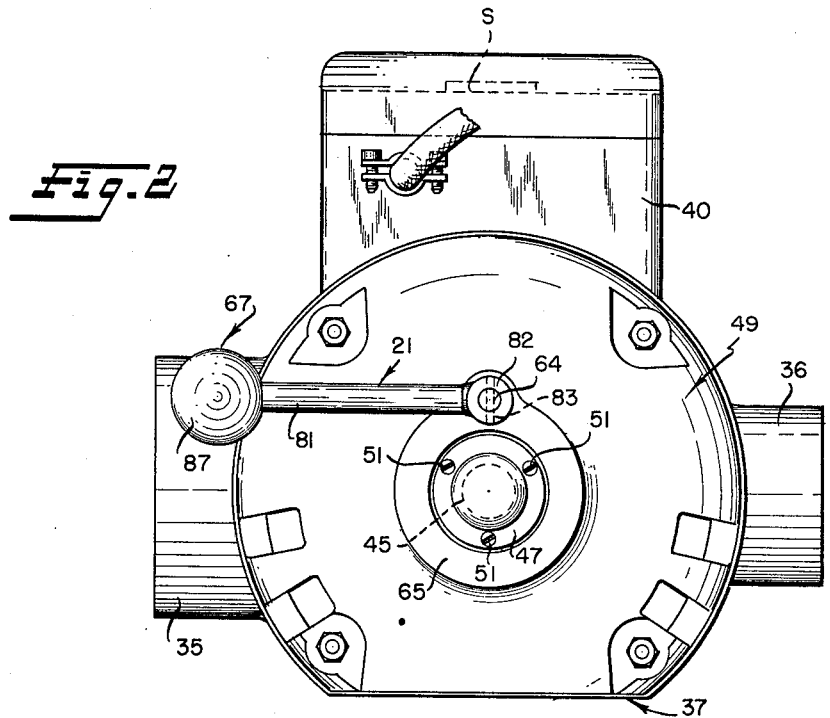
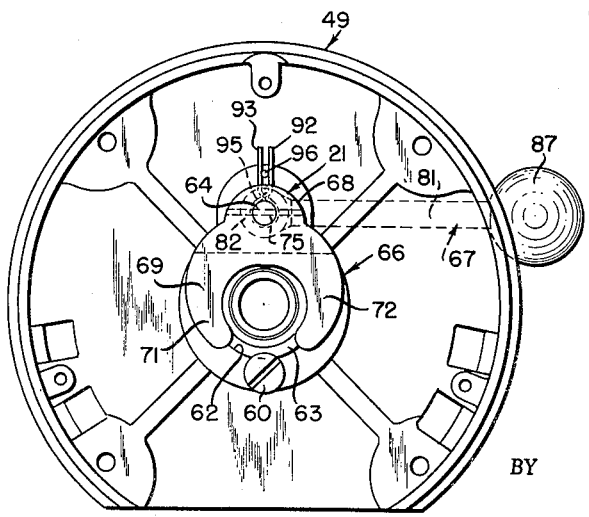
INVENTORS
Edwin B. Deuschle
Rex P. Deghuee
BY
ATTORNEYS April 13, 1965   E. B. DEUSCHLE ETAL   3,177,977
BRAKE FOR RADIAL ARM SAWS OR LIKE MACHINING TOOLS
Filed June 26, 1962   3 Sheets-Sheet 3

INVENTORS
Edwin B. Deuschle
Rex P. Deghuee
BY
ATTORNEYS

United States Patent Office 3,177,977
Patented Apr. 13, 1965

3,177,977
BRAKE FOR RADIAL ARM SAWS OR LIKE
MACHINE TOOLS
Edwin B. Deuschle, Tupelo, and Rex P. Deghuee, Amory, Miss., assignors to Rockwell Manufacturing Company, Pittsburgh, Pa., a corporation of Pennsylvania
Filed June 26, 1962, Ser. No. 205,379
8 Claims. (Cl. 188—74)

The present invention relates to machine or power tool brakes and more particularly to brakes for arresting the movement of cutting tools in emergencies or after the driving motor is deenergized.

The need has long been recognized for an effective braking mechanism for motor driven power tools widely employed in industrial machine shops and home work shops to arrest the movement of cutting tools, such as circular saw blades, moulding cutters, planer and jointer heads, in emergencies or when the drive motor has been deenergized upon completion of an operation. While expensive electrically responsive brakes built into the drive motors and cutter engaging friction brakes have been proposed from time-to-time, the expense of the electrically responsive brakes, the uncertainty of effective operation of the friction cutter engaging brakes heretofore proposed, and the danger in the operation of the latter due to their proximity to the high speed cutters has prevented their general usage. Among other things, an effective brake of the type here under consideration necessitates an actuator which is so disposed and of such sizes as to be readily accessible to an operator when an emergency operation of the brake is required and at the same time will assuredly actuate the brake irrespective of the individual operator's impulse reactions which, it has been found by test, fall usually into either a push or pull movement. Broadly speaking, manual brakes are known employing certain of the principles deemed desirable in solving the instant problem as will be clear from a consideration of United States Petters Patent 1,697,758 issued January 1, 1929, to A. Ernemann and 2,898,956 issued August 11, 1959, to W. B. Zern.

It, accordingly, is the primary object of this invention to provide an effective inexpensive brake for machine or power tools that will serve both as an emergency brake and a safety brake for eliminating the unattended free running time of machine or power tool cutters after completion of a cutting operation and de-energization of the drive motor.

A further important object of the present invention resides in the provision of a machine or power tool brakes of simple construction designed for impulse manual actuation.

Another object of the present invention resides in the provision of a machine or power tool brake of the manual actuated type that will not in any way limit the utilization of the tool and yet can be installed closely adjacent the customary operating handle in an area where the operator's hand normally rests enabling the operator to effect split second braking in emergencies and ready braking upon normal conclusion of a cutting operation.

Still another object of the present invention resides in providing a machine or power tool brake of the manual actuated type having an actuating mechanism providing multi-directional operation for effecting the braking action.

Further objects will appear from the following description and appended claims when read in conjunction with the accompanying drawings wherein:

FIGURE 1 is a general perspective view of a radical arm saw illustrating a preferred use of the brake of this invention;

FIGURE 2 is an end view of the motor of FIGURE 1 as seen from the brake end;

FIGURE 3 is a view of the motor end bell and brake assembly removed from the motor of FIGURE 2 and illustrating the friction brake element in its normal inoperative position;

Figure 4:
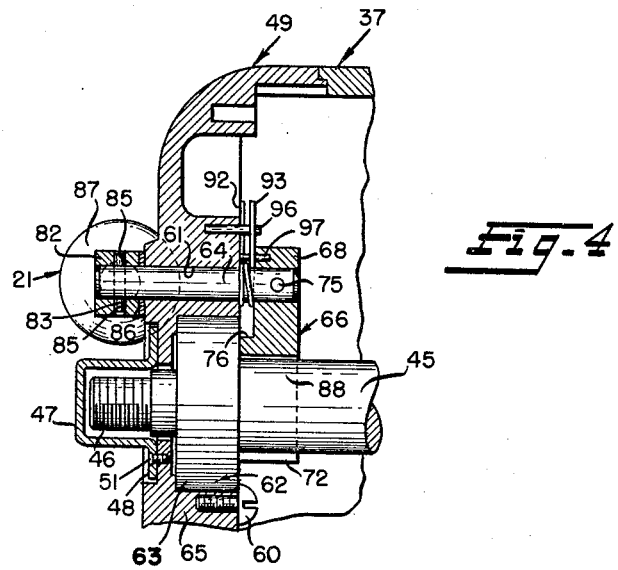
FIGURE 4 is a fragmental sectional view taken substantially on line 4—4 of FIGURE 1 showing the details of the brake mounting.

With continued reference to the drawings wherein the same parts are designated throughout by the same reference numerals, numeral 20 identifies a radial arm sawing machine equipped with a brake mechanism generally designated 21 made in accord with this invention. To best understand the use and operation of the instant brake mechanism, it should be noted that the illustrated machine tool comprises a base 22 supported by floor engaged legs 23 and formed with an upstanding post socket 24 for vertically adjustably mounting a main support column or post 25. The upper end of post 25 fixedly supports one end of a radially directed arm 26 which extends forwardly across base 22 in vertically spaced relation thereto midway between its opposite ends and terminates in a vertical journal socket the axis of which lies substantially in the plane of the longitudinal center of the wooden plank work support table 27 overlying base 22. The journal socket, as will more fully appear from United States Letters Patent 2,356,610 issued August 22, 1944, to H. F. Penney, rotatably mounts in depending relation an elongated trackway 28 which has a traversible carriage 29 mounted thereon for longitudinal back and forth movement or for fixed connection thereto upon actuation of the carriage clamp designated generally by reference numeral 30. Carriage 28 rotatably supports a depending yoke member 31 the spaced arms 32 and 33 of which are provided with aligned journal bores for receiving respective trunnion bosses 35 and 36 of an electric motor 37 as will more fully appear from a consideration of the aforesaid Letters Patent 2,356,610. The yoke 31, as here shown, is locked in any angularly adjusted position by means of locking lever 39 while trackway 28 is locked in its various angularly adjusted positions by locking lever 41. Arm 32 of yoke 31 is formed with an operator's handle 42 which is grasped to effect reciprocating movement of the carriage and yoke along trackway 28 or to adjust the yoke 31 angularly with respect to carriage 29. Preferably motor 37 is provided with a housing 40 containing an overload switch (not shown) adapted to be reset by means of an overload switch button S.

As is customary in radial arm sawing machines the cutting blade 44 is directly mounted on one protruding end of the motor rotor shaft 45 (FIGURES 2 and 4) while the other protruding end 46 (FIGURE 4) is normally left exposed for attachment of alternate devices but may be covered by a cover cap 47 secured to the recessed hub portion 48 of motor end bell 49 by screws 51. Blade 44 is conventionally guarded throughout a major portion of its periphery by a blade guard 52 conventionally spouted at 53 for attachment to a dust collector hose 54 leading to a dust collector (not shown). Guard 52 also axially adjustably supports a splitter and kick-back finger support post 55 in well known manner.

The structure so far described, except for the brake mechanism 21 generally mentioned, forms no part of the present invention but has been shown and described to highlight the need and utility of the brake mechanism 21 and its built-in cooperation with end bell 49. In actual use, motor 37 drives blade 44 in the direction of the arrow shown in FIGURE 1 at high speed. As will be apparent from FIGURE 1, the lower exposed portion of blade 44 is positioned vertically to cut completely through or partially through a workpiece placed on table 27 against wooden fence 56 as may be desired. In cross cutting and angle cutting of the workpiece the carriage, yoke, motor and saw blade are traversed longitudinally of the trackway 28 by the operator who grasps handle 42 to draw and hold the carriage 29 and the carriage supported mechanism toward the front of the table with one hand while positioning the workpiece against fence 56 and then pushes the carriage 29 toward column 25 to pass the blade through the workpiece or releases the handle to permit the carriage 29 to be pulled toward the column 25 by means of a conventionally known extensible spring actuated feed cable (not shown) connected between carriage 29 and the back end of trackway 28. In ripping a workpiece, the carriage 29 is locked in the desired position along trackway 28, which is usually set at right angles to fence 56, with yoke 31 angularly adjusted to dispose the saw blade in parallelism to fence 56 and the workpiece is manually or power fed along the table and fence to the rotating blade 44. In either case, safe operation requires complete stoppage of blade rotation upon conclusion of a cutting operation or manipulation of the workpiece to avoid possible serious injury to the operator or even passers by through contact with the exposed portion of the rotating blade and to minimize loss of production time of an operator should he, for safety's sake, be compelled to wait for the rotational inertia, after actuation of the motor cut off switch, to be dissipated.

Figures 5, 6:
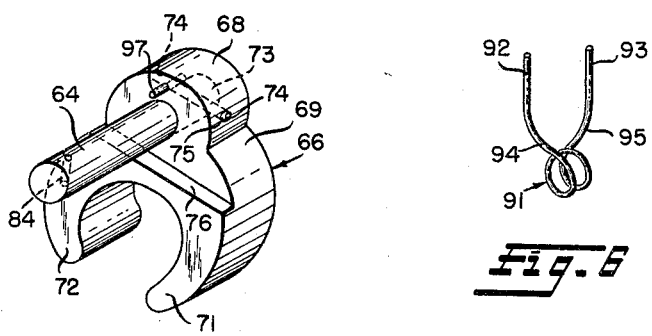
FIGURE 5 is a perspective view of the brake element of the present invention with the brake shaft and return spring actuator pin assembled therewith; and, FIGURE 6 is a perspective view of the return spring provided for mounting on the brake shaft to cooperate with the return spring actuator pin and maintain the brake mechanism in its normally inoperative position.

The brake mechanism 21 of the present invention, is formed as an integral part of the motor 37 by providing the end bell 49 at the rotor shaft end opposite that upon which the cutting tool is mounted with a through bore 61 (FIGURE 4) paralleling the rotor shaft step bore 62 containing shaft bearing 63 held in place by retainer screw 60 and journalling a stub brake shaft 64 in bore 61. As best shown in FIGURE 4, bore 61 is formed in the end bell hub 65 with its opposite ends opening through the inner and outer end faces of end bell hub 65 so as to rotatably encompass a substantial length of shaft 64 the opposite ends of which extend well beyond the hub end faces. The inner protruding end of shaft 64 mounts a friction brake element 66 while the outer protruding end of shaft 64 fixedly mounts a brake actuating member 67. As best shown in FIGURE 5, brake element 66 comprises a hub 68 and an offset body portion 69 formed to brakingly engage rotor shaft 45 upon rotation of brake shaft 64 around its axis. The preferable form of body portion 69 is shown in FIGURE 5 as a body of horseshoe shape symmetrically related to a plane containing the axis of brake shaft 64 with its respective legs 71 and 72 dimensioned to freely pass rotor shaft 45 so long as brake shaft 64 is in its home or non-braking position. To assure a permanent fixed and established relationship between brake shaft 64 and brake element 66, shaft 64 is provided with a diametrical through bore 73 adapted to be aligned with respective diametrically opposed bores 74 formed in hub 68 at right angles to the aforesaid plane containing the axis of brake shaft 64 and a drive pin 75 adapted to extend through shaft bore 73 and into the respective opposed bores 74 of hub 68. As best seen from FIGURES 4 and 5, body 69 is of greater length than hub 68 so as to form an end protrusion 76 adjacent that end of hub 68 from which shaft 64 projects. The purpose of this protrusion will presently appear.

While brake actuating member 67 may assume any suitable form, even that of an automatic actuator designed to be activated by operation of the motor control switch, it is here illustrated as a lever 81 having a hub 82 fixed to the opposite end of brake shaft 64 by a drive pin 83 extending through a diametrical bore 84 (FIGURE 5) extending through shaft 64 at right angles to bore 73 into diametrically aligned bores 85 in hub 82. Preferably an anti-friction thrust washer 86 is disposed around shaft 64 between hub 82 and the adjacent face of end bell hub 65 and the free end of lever 81 is fitted with a hand grip knob 87 adapting brake mechanism 21 for manual actuation.

It is to be noted that brake mechanism 21 is illustrated in FIGURES 1 through 4 in its home or non-braking position with legs 71, 72 of brake element 66 straddling shaft 45. It will be appreciated that rotation of brake shaft 64 in either direction from the illustrated home position will result in brake application since either leg 71 or leg 72 will be swung into surface contact with the adjacently related portion 88 of shaft 45. This is a highly important feature of such a manually operated brake since extensive investigation has disclosed that the push pull impulse reactions of operators under the stress of emergency conditions or casual lever actuation of a manual machine tool brake splits very close to fifty-fifty. The present brake structure is equally effective whether the lever 81 is pushed upwardly or pulled downwardly from its home position.

To assure that the home position will be maintained, except when actuation of brake mechanism 21 is desired, the present invention provides a return spring arrangement designed to fit between the opposing end faces of end bell hub 65 and hub 68 of friction brake element 66 in the axial space provided by end protrusion 76 of the brake element body 69. This return spring comprises a double loop coil spring 91 (FIGURE 6) enclosing the portion of shaft 64 spanning the aforesaid axial space (FIGURE 4) and having its opposite ends 92 and 93 formed at the ends of reversely bent segmental extension portions 94 and 95 (FIGURES 3 and 6) crossing over shaft 64 at the same side of the looped coil body disposing the ends 92 and 93 to lie in laterally spaced axial planes at opposite sides of a common abutment pin 96 end mounted in the face of end bell hub 65. As best seen in FIGURES 3 and 4, pin 96 parallels the axis of shaft 64 and is of a diameter to slightly spread ends 92 and 93 to lightly tension spring 91. Hub 68 of brake element 66 mounts an actuating pin 97 in its face opposing the pin carrying face of end bell hub 65. Pin 97 extends from hub 68 in parallelism to pin 96 to a point just short of the opposing face of end bell hub 65 and like pin 96 lies between spring ends 92 and 93 and is dimensioned to firmly abut the slightly spread spring ends. Preferably spring 91 is slightly compressed axially between the opposing faces of end bell hub 65 and hub 68 of friction brake element 66 as the friction brake element with shaft 64 fixed therein and spring 91 surrounding shaft 64 is assembled on end bell 49 by entering shaft 64 through bore 61 and washer 86 and fixing hub 82 of lever 81 to the free end. This axial compression is sufficient only to take up end play of shaft 64 in through bore 61 and the slight spreading of spring legs 92 and 93 is just sufficient to wind spring 91 to assure a torsional spring force sufficient to positively maintain friction spring element 66 in its home position with its legs 71 and 72 in free straddling relation to portion 88 of shaft 45.

Operation of the brake mechanism 21 of this invention is as follows. Assuming motor 37 to be energized to drive saw blade 44 and that a cutting operation is completed, the motor switch (not shown) will be turned to its off position to de-energize the motor. In the absence of brake actuation, the rotor shaft 45 and blade 44 will continue to rotate at substantial speed and without appreciable noise under inertia forces presenting a dangerous injury hazard to passing shop personnel or the operator who may reach across the table to remove the workpiece. With the brake of the present application installed, the well trained operator, after actuating the motor switch, will grasp lever 81 and either push it upwardly or pull it downwardly thereby rotating shaft 64 to respectively swing leg 71 or leg 72 of friction brake element 66 into braking engagement with portion 88 of shaft 45 to brake the rotation of shaft 45 and blade 44 to a standstill. Simultaneously with the rotation of shaft 64, hub 68 and actuating pin 97 carried thereby will rotate around the axis of shaft 64 causing pin 97 to move either spring leg 93 or spring leg 92 away from abutment pin 96 thereby winding spring 91 to increase the stored torsional force of the spring. Upon release of lever 81, the increased torsional force of spring 91 will be released allowing the moved spring leg in engagement with pin 97 to drive pin 97 and friction brake element 66 in the opposite direction until the moved spring leg reengages pin 96 at which time the brake element 66 and lever 81 will be restored to the non-braking home position.

Assuming similar motor energization with shaft 45 and blade 44 being driven at high speed and any emergency condition having occurred necessitating emergency stopping of the motor and blade rotation, the operator merely grasps lever 81 and pushes or pulls the lever to rotate brake shaft 64 and swing the friction brake element 66 into braking engagement with portion 88 of shaft 45 thereby applying a braking force sufficient to overload the motor 37 and actuate the overload switch. Deenergization of motor 37 and braking of rotor shaft 45 and blade 44 is, therefore, effected solely by actuation of lever 81 under emergency conditions and the impulse reactions of the operator to push or pull lever 81 is all that is required to effect an emergency stoppage of the cutting operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A brake for a radial arm saw or like machine tool having a reciprocably mounted motor including end bells journalling a motor shaft carrying at one end a cutting tool, said brake comprising a brake shaft journalled in the motor end bell remote from said one end of said motor shaft and protruding at opposite ends beyond the inner end bell wall face and the outer end bell wall face respectively; a brake element fixed to said brake shaft end protruding beyond the inner end bell wall face and adapted for movement into and out of engagement with the adjacently related portion of said motor shaft; means normally biasing said brake element to its out of engagement position; and selectively operable, normally ineffective means for effecting movement of said brake shaft and said brake element in opposition to said biasing means to engage said brake element with said adjacently related portion of said motor shaft to brake said shaft and the saw blade carried thereby, said selectively operable means for effecting movement of said brake shaft and brake element comprising a hand lever fixed to the end of said brake shaft protruding beyond the outer end bell wall face and adapted to be gripped by the operator and manipulated to effect rotary movement of said brake shaft to brakingly engage said brake element with said adjacently related portion of said motor shaft.

2. A brake for a radial arm saw or like machine tool having a reciprocably mounted motor including end bells journalling a motor shaft carrying at one end a cutting tool, said brake comprising a brake shaft journalled in the motor end bell remote from said one end of said motor shaft with an end protruding beyond the inner end bell wall face; a brake element fixed to said brake shaft end protruding beyond the inner end bell wall face and adapted for movement into and out of engagement with the adjacently related portion of said motor shaft; means normally biasing said brake element to its out of engagement position; and selectively operable, normally ineffective means for effecting movement of said brake shaft and said brake element in opposition to said biasing means to engage said brake element with said adjacently related portion of said motor shaft to brake said shaft and the saw blade carried thereby, the other end of said brake shaft being disposed to protrude beyond the outer end bell wall face, said selectively operable means for effecting movement of said brake shaft and said brake element comprising a hand lever fixed to said other end of said brake shaft and adapted to be gripped by the operator and manipulated to effect rotary movement of said brake shaft in either direction to brakingly engage said brake element with said adjacently related portion of said motor shaft.

3. A brake for a radial arm saw or like machine tool having a reciprocably mounted motor including end bells journalling a motor shaft carrying at one end a cutting tool, said brake comprising a brake shaft journalled in the motor end bell remote from said one end of said motor shaft with an end protruding beyond the inner end bell wall face, a brake element fixed to said brake shaft end protruding beyond the inner end bell wall face and adapted for movement into and out of engagement with the adjacently related portion of said motor shaft, means normally biasing said brake element to its out of engagement position, and selectively operable, normally ineffective means for effecting movement of said brake shaft and said brake element in opposition to said biasing means to engage said brake element with said adjacently related portion of said motor shaft to brake said shaft and the saw blade carried thereby, said means normally biasing said brake element to its out of engagement position comprising a coil spring disposed in encircling relation to the portion of said brake shaft lying between said inner end bell wall face and said brake element with its opposite ends extending along opposite sides of a longitudinal plane containing the longitudinal axis of said brake shaft; a fixed pin mounted in said end bell and lying between said extending spring ends in said longitudinal plane; and a movable actuator pin fixed to said brake element to move therewith and normally lying between said extending spring ends in said longitudinal plane, said movable pin being operative upon movement with said brake element to engage one of said spring ends to wind said spring against the arresting engagement of said other spring end with said fixed pin thereby storing energy in said spring for effectively returning said brake element to its out of engagement position upon release of said selectively operable means.

4. A brake for a radial arm saw or like machine tool having a reciprocably mounted motor including end bells journalling a motor shaft carrying at one end a cutting tool, said brake comprising a brake shaft journalled in the motor end bell remote from said one end of said motor shaft with an end protruding beyond the inner end bell wall face; a brake element fixed to said brake shaft end protruding beyond the inner end wall face and adapted for movement into and out of engagement with the adjacently related portion of said motor shaft; means normally biasing said brake element to its out of engagement position; and selectively operable, normally ineffective means for effecting movement of said brake shaft and said brake element in opposition to said biasing means to engage said brake element with said adjacently related portion of said motor shaft to brake said shaft and the saw blade carried thereby, said brake element comprising a generally horseshoe shaped member of rigid friction material fixed at its mid-point to said protruding end of said brake shaft and disposed with its opposing arms in straddling relation to the adjacently related portion of said motor shaft.

5. An electric motor end bell and motor brake comprising an end bell body of generally dished configuration in cross section having a central hub formation containing a centered through passage for journalling the motor shaft and a radially offset through passage parallelling said centered through passage and located in said hub formation; a brake shaft journalled in said radially offset through passage with its opposite ends protruding from the ends of said radially offset through passage; a friction brake element comprising a generally horseshoe shaped element fixed at its mid-point on the end of said brake shaft which lies within the dished face of said end bell body, and having opposed legs disposed in straddling relation to said centered through passage for respective selected movement transversely with respect to said centered through passage to braking position, a rotor shaft journalled in said centered through passage, said legs having opposed portions each disposed to be moved from a normally inoperative position alongside said centered through passage to a braking position against said rotor shaft; and operating means connected to the other end of said brake shaft for selective moving said friction brake element to braking position.

6. A brake for a radial arm saw or like machine tool having a reciprocally mounted motor including end bells journalling a motor shaft carrying at one end a cutting tool, said brake comprising a brake shaft journalled in the motor end bell remote from said one end of said motor shaft with one end protruding beyond the inner end bell wall face and the other end protruding beyond the outer end bell wall face; a brake element fixed to said brake shaft end protruding beyond the inner end bell wall face and adapted for movement into and out of engagement with the adjacently related portion of said motor shaft; means normally biasing said brake element to its out of engagement position; selectively operable, and normally ineffective means for effecting movement of said brake and said brake element in opposition to said biasing means to engage said brake element with said adjacently related portion of said motor shaft to brake said shaft and the cutting tool carried thereby, said selectively operable means comprising a part operably connected to said other end of said brake shaft and adapted to be gripped by the operator and manipulated to effect rotary movement of said brake shaft to brakingly engage said brake element with said adjacently related portion of said motor shaft.

7. The electric motor end bell and motor brake assembly of claim 5 wherein said operating means connected to the other end of said brake shaft comprises a hand lever movement of which in either direction to rotate said brake shaft will move a leg of said friction brake element into braking position.

8. An electric motor end bell and motor brake assembly for an electric motor having a rotor shaft portion circumferentially exposed adjacent the end bell inner face comprising an end bell body having a central hub formation containing a centered through passage for journalling the rotor shaft and a radially offset through passage located in said hub formation; a brake shaft journalled in said radially offset through passage with its opposite ends protruding from the ends of said radially offset through passage; a friction brake element mounted on the end of said brake shaft lying adjacent the end bell inner face in axially spaced relation to said end bell inner face, said friction brake element comprising a generally horseshoe shaped element fixed at its midpoint to said brake shaft and normally disposed in inoperative position with its opposite legs in straddling relation to said circumferentially exposed rotor shaft portion for selected movement transversely with respect to said circumferentially exposed rotor shaft portion to braking position; a coil spring encircling said brake shaft between said brake element and said end bell inner face and having opposite ends formed into legs which are disposed in laterally spaced relation to a plane containing the longitudinal center line of said brake shaft; an abutment pin mounted in said end bell hub formation and extending therefrom between said spring legs and dimensioned to normally abuttingly engage each of said spring legs in a manner to pre-tension said spring around said brake shaft; a winding pin mounted in said friction brake element and extending therefrom between said spring legs and dimensioned to abuttingly contact said spring legs to maintain said friction brake element legs in centered inoperative straddling relation to said circumferentially exposed rotor shaft portion; and operating means connected to the other end of said brake shaft for selective movement in opposite directions to move said friction brake element to braking position and said winding pin to force one of said spring legs out of engagement with said abutment pin thereby further tensioning said spring to forcefully return said brake element to its normally inoperative position upon deactivation of said operating means.

References Cited by the Examiner
UNITED STATES PATENTS

| 436,930 | 9/90 | Weddendorf | 188—74 |
| 648,273 | 4/00 | Lindstrom | 188—75 |
| 655,562 | 8/00 | Lindstrom | 188—75 |
| 1,974,019 | 9/34 | Edwards | 188—74 X |
| 2,334,748 | 11/43 | Britts | 188—74 X |
| 2,855,888 | 10/58 | Hazen et al. | 188—74 X |
| 2,898,956 | 8/59 | Zern | 114—17.3 X |
| 3,044,248 | 7/62 | Hall | 188—75 X |

FOREIGN PATENTS

| 196,987 | 4/23 | Great Britain. |
| 12,241 | 3/00 | Sweden. |

FERGUS S. MIDDLETON, *Primary Examiner.*

ARTHUR L. LA POINT, *Examiner.*